US009483846B2

(12) United States Patent
Fan et al.

(10) Patent No.: US 9,483,846 B2
(45) Date of Patent: Nov. 1, 2016

(54) DATA INTERPOLATION AND CLASSIFICATION METHOD FOR MAP DATA VISUALIZATION

(71) Applicant: Microsoft Corporation, Redmond, WA (US)

(72) Inventors: Xun Fan, Shanghai (CN); Zhongwei Wu, Shanghai (CN); Chen Hong, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 528 days.

(21) Appl. No.: 13/904,669

(22) Filed: May 29, 2013

(65) Prior Publication Data
US 2014/0354677 A1    Dec. 4, 2014

(51) Int. Cl.
*G06T 11/00*  (2006.01)
*G06K 9/62*   (2006.01)
*G06T 11/20*  (2006.01)
*G09B 29/00*  (2006.01)

(52) U.S. Cl.
CPC ........... *G06T 11/001* (2013.01); *G06K 9/6267* (2013.01); *G06T 11/206* (2013.01); *G09B 29/007* (2013.01)

(58) Field of Classification Search
CPC ................ G06T 5/002; G06T 5/005; G06T 2207/10024; G06T 7/0081; G06T 5/20
See application file for complete search history.

(56) References Cited

U.S. PATENT DOCUMENTS

| 2004/0246252 | A1 | 12/2004 | Morrow et al. |
| 2008/0165186 | A1 | 7/2008 | Lin |
| 2011/0170756 | A1 | 7/2011 | Schneider |
| 2012/0219200 | A1 | 8/2012 | Reeves et al. |

OTHER PUBLICATIONS

Toczek, et al., "Efficient Memory Management for Uniform and Recursive Grid Traversal", In Algorithm-Architecture Matching for Signal and Image Processing, vol. 73, Retrieved date: Apr. 16, 2013, 26 pages.
"Surfer11", Retrieved at <<http://www.goldensoftware.com/products/surfer#features>>, Retrieved date: Apr. 16, 2013, 2 pages.
Chen, Hong, "Towards Design Patterns for Dynamic Analytical Data Visualization", In International Society for Optics and Photonics, Jun. 2004, 12 pages.
International Search Report & Written Opinion for PCT Application No. PCT/US2014/039481, Mailed Date: Oct. 31, 2014, 11 Pages.
Wang, et al., "A Quadtree Approach to Domain Decomposition for Spatial Interpolation in Grid Computing", In Parallel Computing—Special Issue: High Performance Computing with Geographical Data, vol. 29, Issue 10, Oct. 2003, pp. 1481-1504.

(Continued)

Primary Examiner — Maurice L McDowell, Jr.
Assistant Examiner — Raffi Isanians
(74) Attorney, Agent, or Firm — Aneesh Mehta; Micky Minhas

(57) ABSTRACT

A method is provided for applying a visual classification scheme to a map. A target region comprising a plurality of display units is identified within the map. It is then determined whether all of the display units within the target region can be assigned to the same class based on interpolated data values obtained for only a subset of the display units within the target region. If the determination is positive, then all of the display units within the target region are assigned to the same class and a visual indicator is assigned to each display unit in the target region based on the class to which the display unit was assigned. If the determination is negative, then the target region is divided into a plurality of subdivided target regions and the foregoing method is applied to each of the subdivided target regions.

20 Claims, 8 Drawing Sheets

(56) References Cited

OTHER PUBLICATIONS

Zhou, et al., "A Novel Adaptive Algorithm for Spatial Interpolation", In Proceedings of the 19th International Conference on Geoinformatics, Jun. 24, 2011, pp. 1-4.

Amidror, Isaac, "Scattered Data Interpolation Methods for Electronic Imaging Systems: A Survey", In Journal of Electronic Imaging, vol. 11, Issue 2, Apr. 2002, pp. 157-176.

Lu, et al., "An Adaptive Inverse-Distance Weighting Spatial Interpolation Technique", In Computers & Geosciences, vol. 34, Issue 9, Sep. 2008, pp. 1044-1055.

International Preliminary Report on Patentability Issued in PCT Application No. PCT/US2014/039481, Mail Date: Sep. 25, 2015, 5 Pages.

DATA INTERPOLATION AND CLASSIFICATION METHOD FOR MAP DATA VISUALIZATION

BACKGROUND

Automated systems exist that enable data to be visualized on top of a map so that such data is easy to view. For example, such a system may enable a large amount of environmental data that is retrieved from environmental data collection stations to be visualized on top of a geographical map. Such environmental data may include, for example, atmospheric concentrations of particulate matter 2.5 ($PM_{2.5}$), particulate matter 10 ($PM_{10}$), sulfur dioxide ($SO_2$), nitrogen dioxide ($NO_2$), or the like. In further accordance with such an example, sampling data that is periodically obtained from the environmental data collection stations may be used to generate and periodically update a colored map of a specific area (e.g., a city, state or country) that illustrates the degree of pollution.

A conventional method for generating the colored map involves performing interpolation, classification and coloring of each display unit (e.g., each pixel) of the colored map image one by one. In accordance with this conventional method, the first step is to calculate an interpolated data value for each display unit in the colored map image that is not already associated with a sampled data value based on the available sampled data values. After this, each display unit is assigned to a particular class based on its associated sampled or interpolated data value. Then, each display unit is colored based on its assigned class in accordance with a reference coloring table. This method is problematic in that it is time consuming, as an interpolated data value must be calculated for each display unit in the colored map image that is not already associated with a sampled data value. This method is also computationally complex. For example, for a colored map image that is square in shape and has N display units per side, the complexity of this method is on the order of $N^2$.

SUMMARY

An automated method for applying a visual classification scheme to display units of a map based on one or more known data values associated with a subset of the display units is described herein. In accordance with the method, a target region comprising a plurality of display units is identified within the map. Then, it is determined whether all of the display units within the target region can be assigned to a same one of a plurality of classes based on interpolated data values obtained for only a subset of the display units within the target region. If it is determined that all of the display units within the target region can be assigned to the same one of the plurality of classes based on the interpolated data values obtained for only the subset of the display units within the target region, then all of the display units within the target region are assigned to the same one of the plurality of classes and a visual indicator is assigned to each display unit in the target region based on the class to which the display unit was assigned.

The foregoing method may further include dividing the target region into a plurality of subdivided target regions and applying the foregoing method to each of the subdivided target regions if it is determined that all of the display units within the target region cannot be assigned to the same one of the plurality of classes based on the interpolated data values obtained for only the subset of the display units within the target region.

The foregoing method is less time-consuming and complex than the conventional method described in the Background Section above, as it can achieve classification and visualization of target regions comprising numerous display units without having to calculate an interpolated data value for each display unit in the target region that is not already associated with a known data value.

A system is also described herein. The system includes one or more processors and a storage medium. The storage medium stores computer program logic that is executable by the one or more processors to cause the one or more processors to apply a visual classification scheme to display units of a map based on one or more known data values associated with a subset of the display units. The computer program logic includes a first program module, a second program module, a third program module and a fourth program module. The first program module is configured to identify a target region comprising a plurality of display units within the map. The second program module is configured to determine whether all of the display units within the target region can be assigned to a same one of a plurality of classes based on interpolated data values obtained for only a subset of the display units within the target region. The third program module is configured to assign all of the display units within the target region to the same one of the plurality of classes and assign a visual indicator to each display unit in the target region based on the class to which the display unit was assigned in response to a determination by the second program module that all of the display units within the target region can be assigned to the same one of the plurality of classes based on the interpolated data values obtained for only the subset of the display units within the target region. The fourth program module is configured to divide the target region into a plurality of subdivided target regions, each of the plurality of subdivided target regions comprising a new target region for processing by the second program module, in response to a determination by the second program module that all of the display units within the target region cannot be assigned to the same one of the plurality of classes based on the interpolated data values obtained for only the subset of the display units within the target region.

A computer program product is also described herein. The computer program product comprises a computer-readable storage medium having computer program logic recorded thereon for enabling a processing unit to apply a visual classification scheme to display units of a map based on one or more known data values associated with a subset of the display units. The computer program logic includes first computer program logic, second computer program logic and third computer program logic. When executed by the processing unit, the first computer program logic identifies a target region comprising a plurality of display units within the map. When executed by the processing unit, the second computer program logic determines whether all of the display units within the target region can be assigned to a same one of a plurality of classes based on interpolated data values obtained for only a subset of the display units within the target region. When executed by the processing unit, the third computer program logic assigns all of the display units within the target region to the same one of the plurality of classes and assigns a visual indicator to each display unit in the target region based on the class to which the display unit was assigned in response to a determination by the second computer program logic that all of the display units within the target region can be assigned to the same one of the plurality of classes based on the interpolated data values obtained for only the subset of the display units within the target region.

The computer program logic may further include fourth computer program logic that, when executed by the processing unit, divides the target region into a plurality of subdivided target regions, each of the plurality of subdivided target regions comprising a new target region for processing by the second computer program logic, in response to a determination by the second computer program logic that all of the display units within the target region cannot be assigned to the same one of the plurality of classes based on the interpolated data values obtained for only the subset of the display units within the target region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
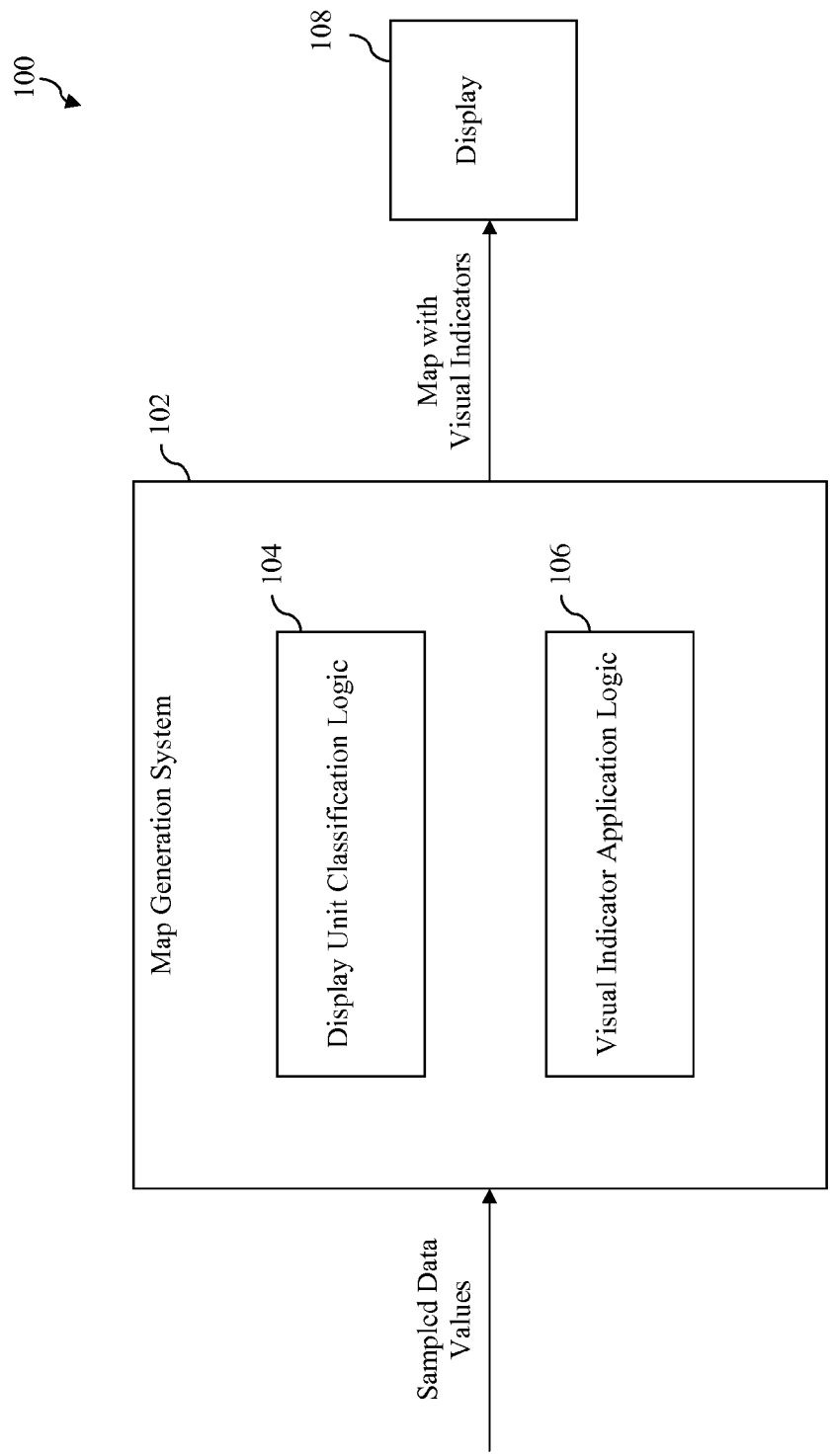
FIG. 1 is a block diagram of an example system that applies a visual classification scheme to display units of a map in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

II. Example Embodiments

FIG. 1 is a block diagram of an example system 100 that applies a visual classification scheme to display units of a map in accordance with an embodiment. As shown in FIG. 1, system 100 includes at least a map generation system 102 and a display 108 that is communicatively connected thereto. Each of these elements will now be described.

Map generation system 102 is intended to represent an automated system that operates to receive sampled data values from one or more sources and to use such sampled data values to generate and/or update an image that visually depicts such sampled data values in the context of a map. By way of example, map generation system 102 may be configured to receive sampled data values from a plurality of geographically-distributed environmental data collection stations, wherein each sampled data value represents an atmospheric concentration of a particular pollutant as measured at a particular environmental data collection station. Within the context of this example, a sampled data value may represent, for instance, an atmospheric concentration of particulate matter 2.5 ($PM_{2.5}$), particulate matter 10 ($PM_{10}$), sulfur dioxide ($SO_2$), nitrogen dioxide ($NO_2$), or the like. In further accordance with this example, map generation logic 102 is further configured to use such sampled data values to generate and/or update an image that visually depicts the atmospheric concentration of certain pollutants across a geographic area represented as a map. Map generation system 102 then provides the image of the map to display 108 for rendering thereby, so that the map image may be viewed by one or more users.

Figure 2:
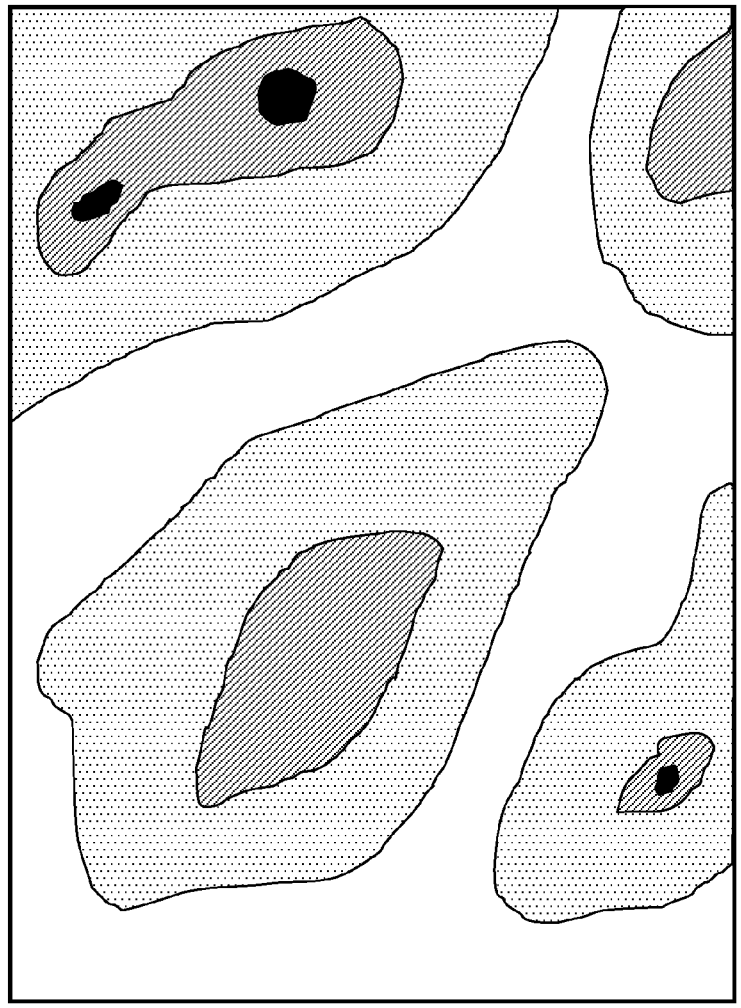
FIG. 2 depicts an example shaded map of a geographic area that illustrates the concentration of a particular pollutant at various points throughout the geographic area.

For example, map generation system 102 may be configured to generate a colored map of a specific geographic area (e.g., a city, a state or a country) that illustrates the concentration of a particular pollutant at various points throughout the geographic area. FIG. 2 provides an example of such a map 200. Since FIG. 2 is a black-and-white image, different shading patterns have been substituted for colors. In particular, as shown in FIG. 2, geographic areas of map 200 that are determined to have an atmospheric concentration of a particular pollutant in the range of 0-40 mg/m$^3$ are shown in white, geographic areas of map 200 that are determined to have an atmospheric concentration of the particular pollutant in the range of 40-80 mg/m$^3$ are shown using a dotted shading pattern, geographic areas of map 200 that are determined to have an atmospheric concentration of the particular pollutant in the range of 80-120 mg/m$^3$ are shown using a lined shading pattern, and geographic areas of map 200 that are determined to have an atmospheric concentration of the particular pollutant in the range of 120-160 mg/m$^3$ are shown in black.

Map generation system 102 may be configured to update the map image at regular or irregular intervals based on additional sampled data values that are periodically or intermittently received or obtained from the different environmental data collection stations. Map configuration system 102 then provides the updated map image to display 108 for rendering thereby. In certain applications, it may be desired to update the map within a very short amount of time (e.g., within minutes or seconds) to satisfy a real-time visualization requirement.

In an embodiment, the image of the map generated by map generation system 102 is comprised of a plurality of display units. Each display unit may comprise, for example, a single pixel. Each display unit may also comprise a plurality of pixels. For example, a single display unit may consist of a square made up of four pixels, with two pixels to each side. As another example, a single display unit may consist of a rectangle made up of eight pixels, with two pixels on the short sides of the rectangle and four pixels on the long sides. As will be appreciated by persons skilled in the relevant art(s), a display unit may include other numbers and/or arrangements of pixels.

To generate the map, map generation system 102 includes display unit classification logic 104 and visual indicator application logic 106. Display unit classification logic 104 operates to assign each display unit of the map to one of a plurality of classes. For example, with continued reference to example map 200 of FIG. 2, display unit classification logic 104 may estimate the atmospheric concentration of a pollutant at a location represented by a particular display unit within map 200 based on sampled data values received from the environmental data collection stations. Based on this estimated concentration, display unit classification logic 104 may assign the particular display unit to one of four different classes, wherein each class represents a different range of concentration values (e.g., 0-40 mg/m$^3$, 40-80 mg/m$^3$, 80-120 mg/m$^3$ and 120-160 mg/m$^3$, respectively). For example, if an estimated atmospheric concentration of 44 mg/m$^3$ is calculated for the particular display unit, the particular display unit may be assigned to the 40-80 mg/m$^3$ class. Persons skilled in the relevant art(s) will readily appreciate that a wide variety of different classification schemes may be used depending upon the implementation.

Once each data unit has been classified, visual indicator application logic 106 assigns a visual indicator to each display unit based on the class to which the display unit was assigned. In an implementation in which the map is a colored map, this operation may involve assigning a certain color to each display unit based on the class to which the display unit was assigned. The color to be assigned may be determined based upon a reference coloring table that is available to visual indicator application logic 106. In an implementation in which the map is a black-and-white shaded map such as that shown in FIG. 2, this operation may involve assigning a certain type of shading to each display unit based on the class to which the display unit was assigned. In this case, a reference shading table such as that shown in FIG. 2 may be used. As will be appreciated by persons skilled in the relevant art(s), still other types of visual indicators and reference tables may be used to assign visual indicators to display units.

Once a visual indicator has been assigned to each display unit within the map image, map generator system 102 provides the map image to display 108 for rendering thereby, so that the map image may be viewed by one or more users. Such rendering may include rendering the visual indicator (e.g., a color) associated with each display unit to an area of display 108 associated with that display unit.

Map generation system 102 and the subcomponents thereof (e.g., display unit classification logic 104 and visual indicator application logic 106) may each be implemented in hardware, in software executed to by one or more processing units, or as a combination thereof. An example computer system that may be used to implement map generation system 102 will be described below in reference to FIG. 7.

As noted above, map generation system 102 may receive or obtain the sampled data values from one or more remote sources. Such sampled data values may be received or obtained from the remote sources via one or more networks. In an alternate embodiment, the sampled data values may be buffered in one or more memory devices and retrieved therefrom by map generation system 102. Still other methods may be used to provide the sampled data values to map generation system 102.

Display 108 is intended to broadly represent any device or system capable of rendering map images for viewing by a user. Display 108 may be connected directly to map generation system 102 or may be connected thereto via one or more intervening devices or networks.

Figure 3:
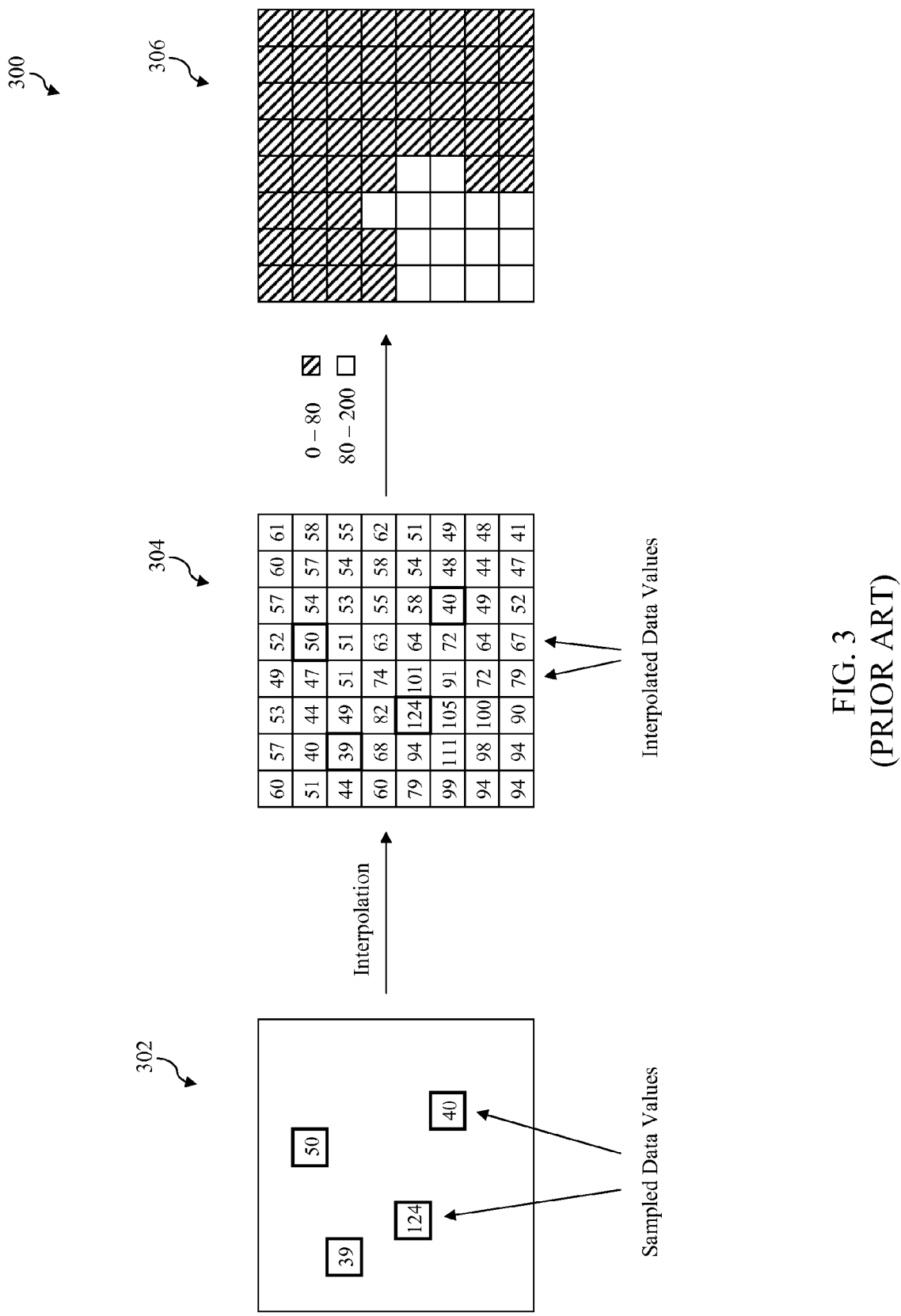
FIG. 3 illustrates a conventional method for applying a visual classification scheme to display units of a map based on one or more known data values associated with a subset of the display units.

FIG. 3 depicts a conventional method that may be used to perform the classification and visual indicator application operations discussed above in reference to map generation system 102. As shown in FIG. 3, during a first stage 302 of the conventional method, the sampled data values received from the different environmental data collection stations are mapped to corresponding display units of a map image. The display units to which these sampled data values are mapped may represent geographical locations at or near which the sampled data values were measured. Then, during a second stage 304 of the conventional method, an interpolated data value is calculated for each of the remaining display units in the map. For example, an inverse distance weighted interpolation method, such as Shepard's method (as described in Shepard, D., "A Two-Dimensional Interpolation Function for Irregularly-Spaced Data," Proceedings of the 1968 ACM National Conference, pp. 517-524 (1968), the entirety of which is incorporated by reference herein), may be used to calculate an interpolated data value for each of the remaining display units in the map. During a third stage 306 of the conventional method, each of the display units are assigned to a particular class based on the sampled or interpolated data value associated therewith. As shown in FIG. 3, a first class represents the numeric range 0-80 and a second class represents the numeric range 80-200. Finally, a visual indicator is assigned to each display unit based on the class to which the display unit was assigned. In this case, if a display unit has been assigned to the class representing the 0-80 numeric range, it is shaded, and if a display unit has been assigned to the class representing the 80-200 numeric range, it will not be shaded.

The conventional method illustrated in FIG. 3 is problematic in that it is time consuming, as an interpolated data value must be calculated for each display unit in the map image that is not already associated with a sampled data value. This method is also computationally complex. For example, for a map image that is square in shape and has N display units per side, the complexity of this method is on the order of $N^2$.

Figure 4:
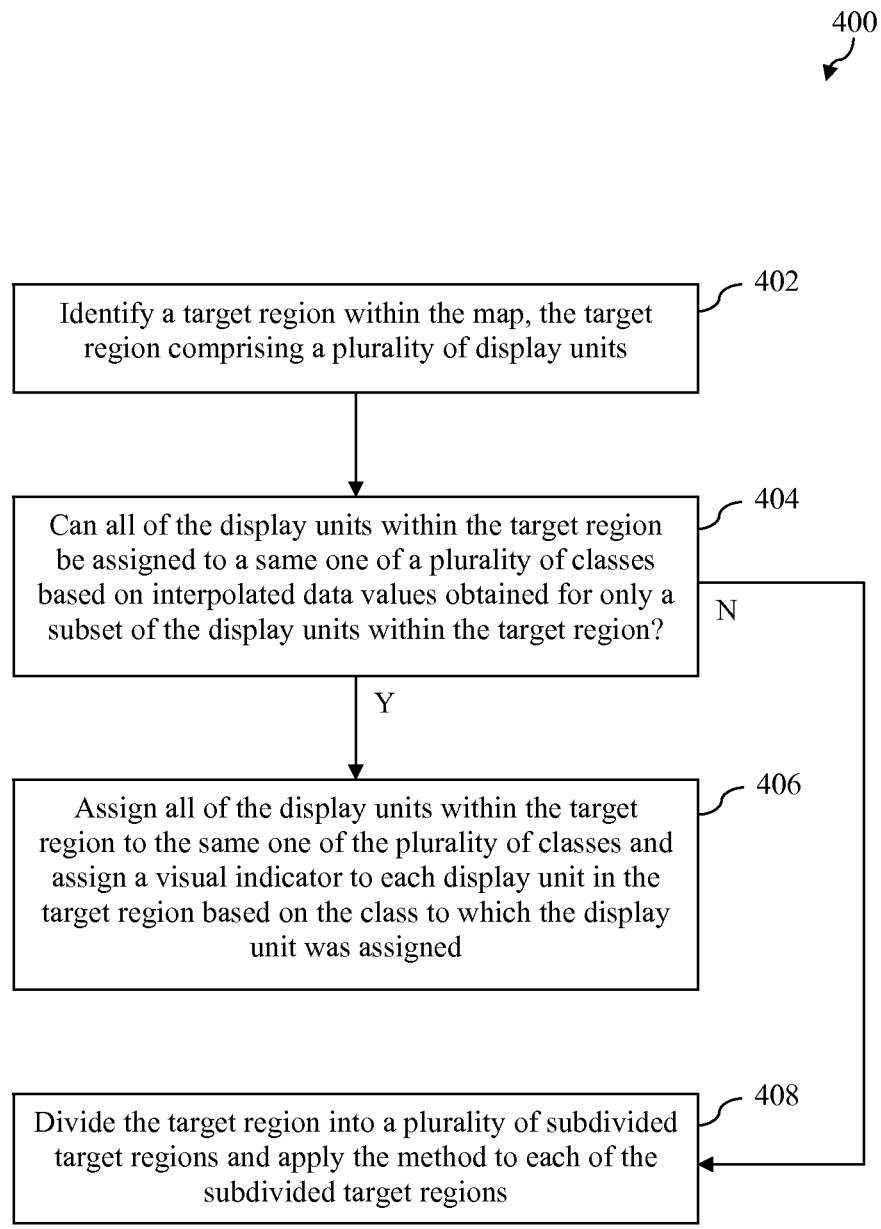
FIG. 4 is a flowchart of a method for applying a visual classification scheme to display units of a map based on one or more known data values associated with a subset of the display units in accordance with an embodiment.

FIG. 4 depicts a flowchart 400 of a method for performing the aforementioned classification and visual indicator application operations in a manner that addresses at least some of the shortcomings of the conventional method. For example, the method of flowchart 400 may be less time-consuming and complex as compared to the conventional method, as it can achieve classification and visualization of target regions of a map that include numerous display units without having to calculate an interpolated data value for each display unit in a target region that is not already associated with a sampled data value. In accordance with certain embodiments, for a map image that is square in shape and has N display units per side, the complexity of the method of flowchart 400 is on the order of N Log N as opposed to $N^2$.

The method of flowchart 400 will now be described. As shown in FIG. 4, the method of flowchart 400 begins at step 402, in which a target region is identified within a map. The target region comprises a plurality of display units. The target region may initially comprise the entire map. Alternatively, the target region may comprise only a portion of the map, such as a subdivided portion of the map. In one embodiment, the target region comprises a target grid.

At decision step 404, it is determined whether all of the display units within the target region can be assigned to a same one of a plurality of classes based on interpolated data values obtained for only a subset of the display units within the target region. As will be described in further detail herein, the subset of the display units within the target region may consist of only boundary display units and next-to-boundary display units within the target region. As will also be described in further detail herein, certain tests may be performed during this step to determine whether all of the display units within the target region can be assigned to the same one of the plurality of classes based on the interpolated data values obtained for only the subset of the display units within the target region. Such tests may include: (1) determining whether or not there are any sampled data values associated with the display units in the target region; (2) determining whether all the boundary and next-to-boundary display units are in the same class; and (3) examining certain mathematical properties of the interpolated data values associated with the boundary and next-to-boundary display units.

If it is determined during decision step 404 that all of the display units within the target region can be assigned to the same one of the plurality of classes based on the interpolated data values obtained for only the subset of the display units within the target region, then control flows to step 406. During step 406, all of the display units within the target region are assigned to the same one of the plurality of classes. Also, during this step, a visual indicator is assigned to each display unit within the target region based on the class to which the display unit was assigned. In an embodiment, since each display unit within the target region has been assigned to the same class, the same visual indicator is assigned to each of the display units within the target region.

If it is determined during decision step 404 that all of the display units within the target region cannot be assigned to the same one of the plurality of classes based on the interpolated data values obtained for only the subset of the display units within the target region, then control flows to step 408. During step 408, the target region is divided into a plurality of subdivided target regions and the method of flowchart 400 is then applied to each of the subdivided target regions.

The foregoing steps of flowchart 400 may be implemented by map generation system 102 as described above in reference to FIG. 1. For example, in one embodiment, display unit classification logic 104 performs all of the operations described in flowchart 400 except for those operations dealing with the assignment of visual indicators to display units, which are performed by visual indicator application logic 106. In an embodiment in which the steps of flowchart 400 are implemented in software, each of the steps of flowchart 400 may be carried out by executing a corresponding computer program module that is configured to perform the operations referred to in that step. An example of a processor-based system that may be used to implement such an embodiment is described below in reference to FIG. 7.

Figure 5:
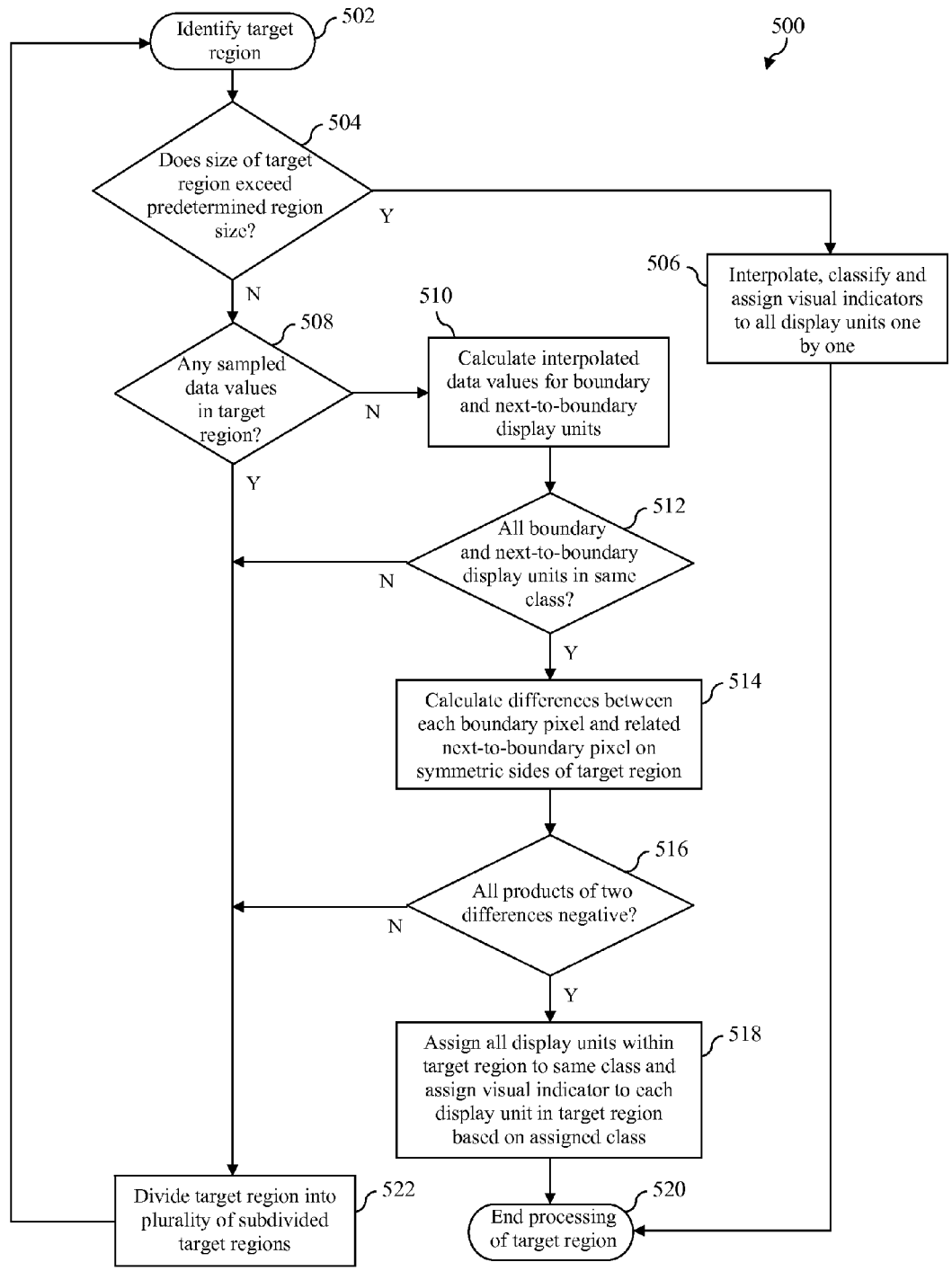
FIG. 5 is a flowchart of a method for applying a visual classification scheme to display units of a map based on one or more known data values associated with a subset of the display units in accordance with an embodiment.

One example implementation of the method of flowchart 400 will now be described in reference to flowchart 500 of FIG. 5. As shown in FIG. 5, the method of flowchart 500 begins at step 502, in which a target region is identified within a map. The target region comprises a plurality of display units. As previously noted, the target region may initially comprise the entire map. Alternatively, the target region may initially comprise a portion of the map, such as one of a plurality of subdivided portions of the map. In accordance with this alternate embodiment, the method of flowchart 500 may be performed for each of the subdivided portions of the map. As also previously noted, the target region may comprise a target grid.

Figure 6A:
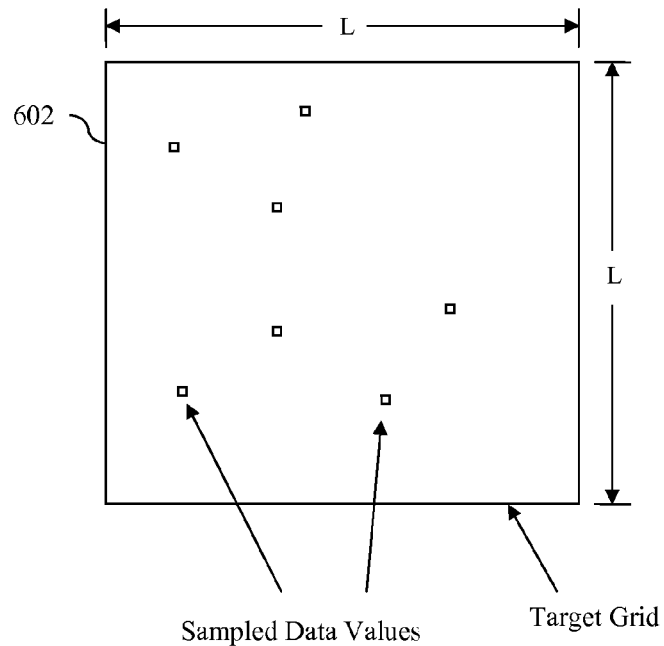
FIG. 6A illustrates an example target grid that may be operated upon by the method illustrated in FIG. 5.
Figure 6B:
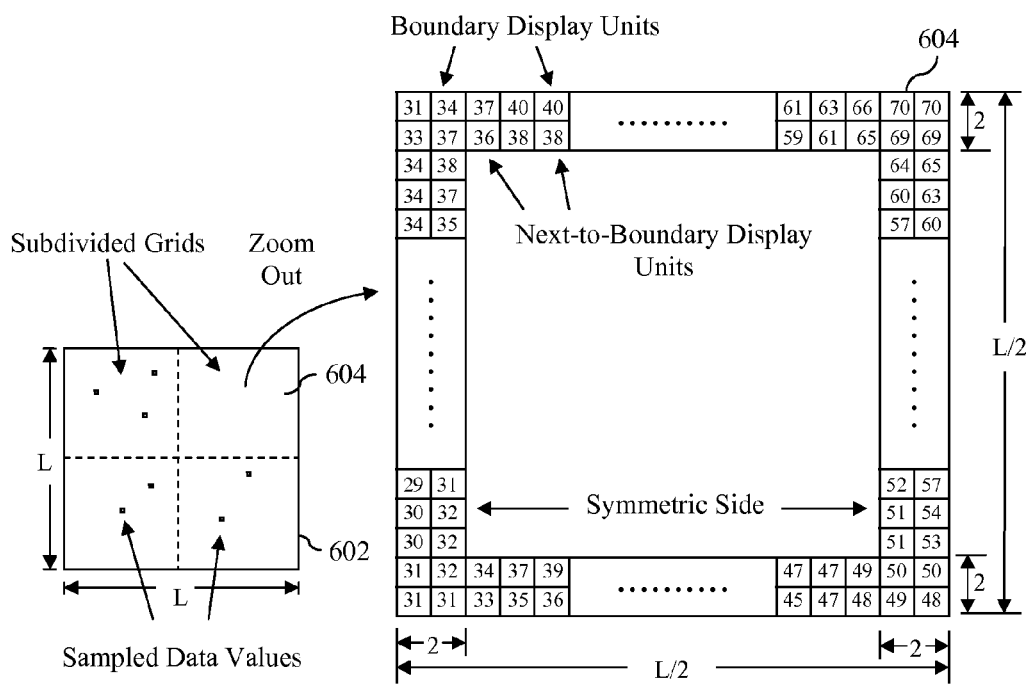
FIG. 6B illustrates an example subdivided target grid that may be operated upon by the method illustrated in FIG. 5.

FIG. 6A shows a target grid 602, which is an example of a target region that may be identified during step 502 and to which the method of flowchart 500 may be applied. FIG. 6B shows that target grid 602 may be subdivided to create a subdivided target grid 604, which is one of four subdivided grids. Each of these four subdivided grids is also a target region that may be identified during step 502 and to which the method of flowchart 500 may be applied.

Returning now to the description of flowchart 500, during decision step 504, it is determined whether the size of the target region exceeds a predetermined region size. In one embodiment, the predetermined region size is 4×4 display units. However, this example is not intended to be limiting and other predetermined region sizes may be used.

If it is determined during decision step 504 that the size of the target region does not exceed the predetermined region size, then it is not necessary to apply the algorithm because calculating an interpolated data value for each display unit one by one is less time consuming. In this case, control flows to step 506. During step 506, interpolation, classification and the assignment of visual indicators is applied to each display unit one by one, in a similar manner to that described above in reference to the conventional method of FIG. 3. In particular, during step 506, interpolation is applied to obtain an interpolated data value for each display unit in the target region that is not already associated with a sampled data value. An inverse distance weighted interpolation method, such as Shepard's method, may be used to perform this operation. Then, each display unit in the target region is selectively assigned to one of a plurality of classes based on the sampled or interpolated data value associated with the display unit. Subsequently, a visual indicator is assigned to each display unit in the target region based on the class to which the display unit was assigned. After step 506, processing of the target region ends at step 520.

If it is determined during decision step 504 that the size of the target region does exceed the predetermined region size, then it is still possible that all of the display units within the target region can be assigned to the same class based on interpolated data values obtained for only a subset of the display units within the target region. In this case, control flows to decision step 508. During decision step 508, it is determined whether any display unit within the target region has a sampled data value associated therewith.

If it is determined during decision step 508 that no display units within the target region have a sampled data value associated therewith, then it is still possible that all of the display units within the target region can be assigned to the same class based on interpolated data values obtained for only a subset of the display units within the target region. In this case, control flows to step 510 so that further tests can be performed.

If it is determined during decision step 508 that at least one display unit within the target region has a sampled data value associated therewith, then all of the display units within the target region cannot be assigned to the same class based on the interpolated data values obtained for only the subset of the display units within the target region. In this case, control flows to step 522. During step 522, the target region is divided into a plurality of subdivided target regions. For example, in one embodiment, the target region is divided into four subdivided target regions. Each of the subdivided target regions then becomes a new target region to which the method of flowchart 500 is applied, as suggested by the arrow connecting step 522 to step 502.

An illustration of decision step 508 and the operations that flow therefrom will now be described in reference to FIGS. 6A and 6B. Assume that the target region is target grid 602. As can be seen in FIG. 6A, target grid 602 includes display units to which sampled data values have been assigned. For this reason, during decision step 508, it will be determined that all of the display units within target grid 602 cannot be assigned to the same class based on interpolated data values obtained for only a subset of the display units within target grid 602 and control will flow to step 522. During step 522, target grid 602 will be subdivided into four subdivided target grids, including subdivided target grid 604, to which the method of flowchart 500 is then applied.

Now assume that the target region is subdivided target grid 604. As can be seen in FIG. 6B, subdivided target grid 604 does not include any display units to which sampled data values have been assigned. For this reason, during decision step 508, it will be determined that it is still possible that all of the display units within subdivided target grid 604 can be assigned to the same class based on interpolated data values obtained for only a subset of the display units within subdivided target grid 604. Accordingly, control will flow to step 510.

Returning now to the description of flowchart 500, during step 510, interpolated data values are calculated for a subset of the display units within the target region. In an embodiment, this step entails calculating interpolated data values for each boundary display unit (i.e., each display unit on an outside edge of the target region) and each next-to-boundary display unit (i.e., each display unit that is immediately adjacent to a boundary display unit but is not itself a boundary display unit). An inverse distance weighted interpolation method, such as Shepard's method, may be used to perform this operation. FIG. 6B provides an illustration of this step. In particular, as shown in FIG. 6B, an interpolated data value has been calculated for each boundary display unit and each next-to-boundary display unit in subdivided target grid 604.

During decision step 512, each of the boundary and next-to-boundary display units is selectively assigned to a class based on the interpolated data values that were calculated for such display units during step 510. Then, it is determined whether all of the boundary and next-to-boundary display units have been assigned to the same class.

If all of the boundary and next-to-boundary display units have not been assigned to the same class, then all of the display units within the target region cannot be assigned to the same class based on the interpolated data values obtained for only the subset of the display units within the target region. In this case, control flows to step 522. During step 522, the target region is divided into a plurality of subdivided target regions and each of the subdivided target regions then becomes a new target region to which the method of flowchart 500 is applied.

If all of the boundary and next-to-boundary display units have been assigned to the same class, then it is still possible that all of the display units within the target region can be assigned to the same class based on interpolated data values obtained for only a subset of the display units within the target region. In this case, control flows to step 514 so that a further test can be performed.

An illustration of decision step 512 and the operations that flow therefrom will now be described in reference to FIG. 6B. For the purposes of this illustration, assume that display units having an interpolated data value in the range of 0-80 are assigned to a first class and display units having an interpolated data value in the range of 80-200 are assigned to a second class. Since all of the boundary and next-to-boundary display units in subdivided target grid 604 have interpolated data values in the range of 0-80, they will all be assigned to the first class. Consequently, during decision step 512 it will be determined that it is still possible that all of the display units within the target region can be assigned to the same class based on interpolated data values obtained for only a subset of the display units within the target region. In this case, control will flow to step 514.

Returning now to the description of flowchart 500, during step 514, a difference is calculated for each boundary display unit on a first side of the target region and for each boundary display unit on a second side of the target region, wherein the first side is opposite to the second side. The difference is calculated for each boundary display unit by subtracting the interpolated data value associated with an adjacent next-to-boundary display unit from the interpolated data value associated with the boundary display unit. For example, with continued reference to FIG. 6B, a difference is calculated for each boundary display unit on the left-hand side of subdivided target grid 604 and for each boundary display unit on the right-hand side of subdivided target grid 604. In further accordance with this example, a difference is calculated for each boundary display unit on either side of the arrow labeled "symmetric side." On the left-hand side, the difference is calculated as 30−32=−2. On the right-hand side, the difference is calculated as 54−51=3.

During decision step 516, products are obtained by multiplying the difference calculated for each boundary display unit on the first side of the target region by the difference calculated for a corresponding (e.g., symmetric) one of the boundary display units on the second side of the target region. For example, with continued reference to FIG. 6B, products are obtained by multiplying the difference calculated for each boundary display unit on the left-hand side of subdivided target grid 604 by the difference calculated for the corresponding (e.g., symmetric) boundary display unit on the right-hand side of subdivided target grid 604. In further accordance with this example, a product is calculated by multiplying the differences obtained for the boundary display units on either side of the arrow labeled "symmetric side," which as noted above are −2 and 3. In this particular example, the product is −2*3=−6.

Once the products have been obtained, it is determined during decision step 516 whether all the products are negative. If not all of the products are negative, then all of the display units within the target region cannot be assigned to the same class based on the interpolated data values obtained for only the subset of the display units within the target region. In this case, control flows to step 522. During step 522, the target region is divided into a plurality of subdivided target regions and each of the subdivided target regions then becomes a new target region to which the method of flowchart 500 is applied.

If it is determined during decision step 516 that all of the products are negative, then all of the display units within the target region can be assigned to the same class based on the interpolated data values obtained for only the subset of the display units within the target region. In this case, control flows to step 518.

Figure 6C:
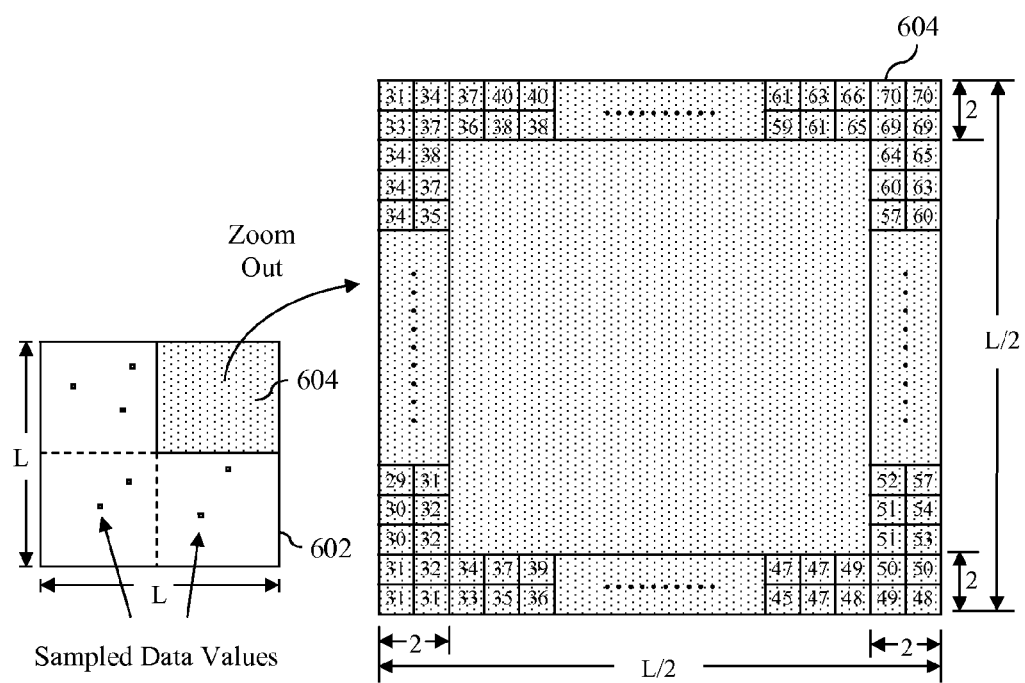
FIG. 6C illustrates an example subdivided target grid that may be operated upon by the method illustrated in FIG. 5.

During step 518, all of the display units within the target region are assigned to the same class and a visual indicator is assigned to each display unit in the target region based on the assigned class. In an embodiment, since each display unit within the target region has been assigned to the same class, the same visual indicator is assigned to each of the display units within the target region. FIG. 6C provides an illustration of this step. As shown in FIG. 6C, all of the display units in subdivided target grid is assigned to the same class and the same visual indicator is thus assigned to each display unit. This is achieved without having to calculate interpolated data values for any of the display units other than the boundary and next-to-boundary display units.

The foregoing steps of flowchart 500 may be implemented by map generation system 102 as described above in reference to FIG. 1. For example, in one embodiment, display unit classification logic 104 performs all of the operations described in flowchart 500 except for those operations dealing with the assignment of visual indicators to display units, which are performed by visual indicator application logic 106. In an embodiment in which the steps of flowchart 500 are implemented in software, each of the steps of flowchart 500 may be carried out by executing a corresponding computer program module that is configured to perform the operations referred to in that step. An example of a processor-based system that may be used to implement such an embodiment is described below in reference to FIG. 7.

As noted above, the foregoing techniques may be used to visualize environmental data associated with different geographic locations on a map. The foregoing techniques may also be used to visualize other types of data as well. For example, the foregoing techniques may be used to visualize weather data (e.g., temperature, precipitation, wind, pressure, etc.), statistical data (e.g., population, age, property, education), and any other data that may be associated with different geographic locations on a map.

Furthermore, the foregoing techniques are not limited to geographic maps. Rather the techniques described herein may be employed to visualize data associated with points or locations in or on any object, area or space that can be represented graphically. For example, the foregoing techniques may be used to present biological data associated with different locations on a human body or on a part of a human body. Thus, the term "map" as used herein is not limited to geographic maps, but is intended to broadly encompass any visual representation of an object, area or space having locations or points therein or thereon with which data may be associated.

Moreover, the foregoing techniques are not limited to processing sampled data values, but can be used to process any type of known data values. As used herein, the term "known data values" refers to data values that are received or obtained by map generation system 102 from one or more sources such that map generation system 102 need not use an estimation method, such as interpolation, to derive them. Thus, in the foregoing description, the term "known data values" may be substituted for the term "sampled data values" wherever such term appears.

III. Example Processor-Based System Implementation

Figure 7:
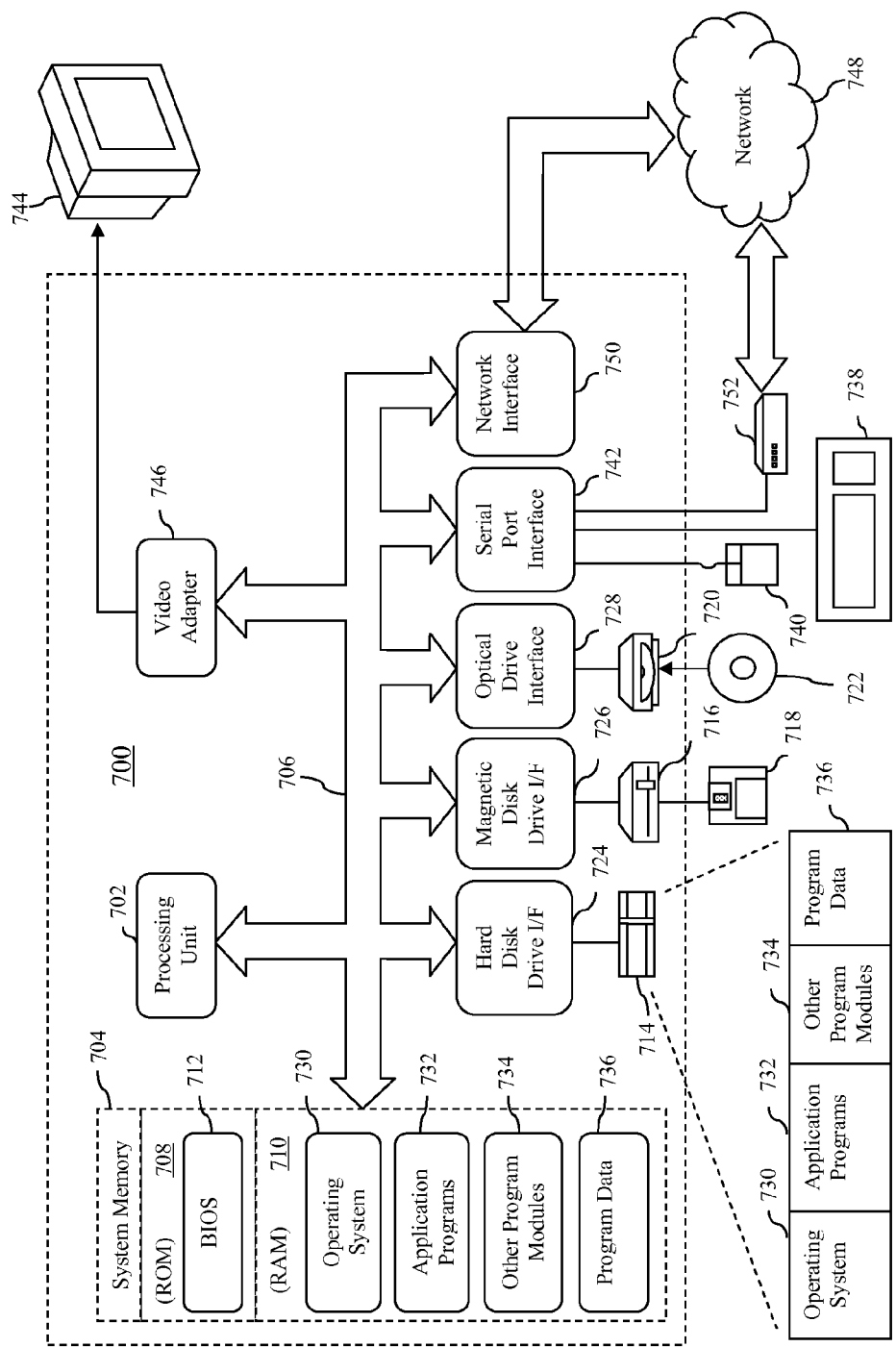
FIG. 7 is a block diagram of an example processor-based computer system that may be used to implement various embodiments.

FIG. 7 depicts an example processor-based computer system 700 that may be used to implement various embodiments described herein. For example, system 700 may be used to execute any of the components described above in reference to FIG. 1 and any of the steps of the flowcharts described above in reference to FIGS. 4 and 5. The description of system 700 provided herein is provided for purposes of illustration, and is not intended to be limiting. Embodiments may be implemented in further types of computer systems, as would be known to persons skilled in the relevant art(s).

As shown in FIG. 7, system 700 includes a processing unit 702, a system memory 704, and a bus 706 that couples various system components including system memory 704 to processing unit 702. Processing unit 702 may comprise one or more processors or processing cores. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

System 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, BLU-RAY™ disk or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 730, one or more application programs 732, other program modules 734, and program data 736. In accordance with various embodiments, the program modules may include computer program logic that is executable by processing unit 702 to perform any or all of the functions and features of the components described above in reference to FIG. 1. The program modules may also include computer program logic that, when executed by processing unit 702, performs any of the steps or operations shown or described in reference to the flowcharts of FIGS. 4 and 5.

A user may enter commands and information into system 700 through input devices such as a keyboard 738 and a pointing device 740. Other input devices (not shown) may include a microphone, joystick, game controller, scanner, or the like. In one embodiment, a touch screen is provided in conjunction with a display 744 to allow a user to provide user input via the application of a touch (as by a finger or stylus for example) to one or more points on the touch screen. These and other input devices may be connected to processing unit 702 through a serial port interface 742 that is coupled to bus 706, but may be connected by other interfaces, such as a parallel port, game port, or a universal serial bus (USB).

Display 744 is also connected to bus 706 via an interface, such as a video adapter 746. In addition to display 744, system 700 may include other peripheral output devices (not shown) such as speakers and printers.

System 700 is connected to a network 748 (e.g., a local area network or wide area network such as the Internet) through a network interface or adapter 750, a modem 752, or other suitable means for establishing communications over the network. Modem 752, which may be internal or external, is connected to bus 706 via serial port interface 742.

As used herein, the terms "computer program medium," "computer-readable medium," and "computer-readable storage medium" are used to generally refer to storage devices or storage structures such as the hard disk associated with hard disk drive 714, removable magnetic disk 718, removable optical disk 722, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750, serial port interface 742, or any other interface type. Such computer programs, when executed or loaded by an application, enable computer 700 to implement features of the embodiments discussed herein. Accordingly, such computer programs represent controllers of the computer 700.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of the components described in reference to FIG. 1 and any of the operations described in reference to FIGS. 4 and 5 may be implemented using hardware logic/electrical circuitry or firmware. In accordance with further embodiments, one or more of these components or operations may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An automated method for applying a visual classification scheme to display units of a map based on one or more known data values associated with a subset of the display units, the method comprising:
    identifying a target region within the map, the target region comprising a plurality of display units;
    obtaining interpolated data values for only a subset of the display units within the target region, the number of the display units in the subset being less than the total number of the display units in the target region, the remainder of the display units within the target region not having known data values and interpolated data values therefor;
    determining, by one or more processors, whether all of the display units within the target region can be assigned to a same one of a plurality of classes based on the interpolated data values obtained for only the subset of the display units within the target region; and
    in response to determining that all of the display units within the target region can be assigned to the same one of the plurality of classes based on the interpolated data values obtained for only the subset of the display units within the target region, assigning all of the display units within the target region to the same one of the plurality of classes and assigning a visual indicator to each display unit in the target region based on the class to which the display unit was assigned.

2. The method of claim 1, wherein identifying the target region within the map comprises identifying a grid of display units within the map.

3. The method of claim 1, further comprising:
in response to determining that all of the display units within the target region cannot be assigned to the same one of the plurality of classes based on the interpolated data values obtained for only the subset of the display units within the target region, dividing the target region into a plurality of subdivided target regions and applying the method to each of the subdivided target regions.

4. The method of claim 3, wherein dividing the target region into the plurality of subdivided target regions comprises dividing the target region into four subdivided target regions.

5. The method of claim 1, further comprising:
in further comprises in further response to determining that all of the display units within the target region can be assigned to the same one of the plurality of classes based on the interpolated data values obtained for only the subset of the display units within the target region, rendering each of the display units of the target region to a display, wherein rendering each of the display units of the target region to the display comprises rendering the visual indicator assigned to each of the display units to an area of the display associated therewith.

6. The method of claim 1, wherein the one or more known data values comprise environmental data.

7. The method of claim 1, wherein each display unit comprises one or more pixels.

8. The method of claim 1, wherein each of the plurality of classes represents a different numeric range.

9. The method of claim 1, wherein the visual indicator assigned to each display unit comprises a color.

10. The method of claim 1, wherein the determining step comprises:
determining whether a size of the target region exceeds a predetermined region size; and
in response to determining that the size of the target region exceeds the predetermined region size, further determining whether all of the display units within the target region can be assigned to the same one of the plurality of classes based on the interpolated data values obtained for only the subset of the display units within the target region.

11. The method of claim 10, further comprising:
in response to determining that the size of the target region does not exceed the predetermined region size, applying interpolation to obtain an interpolated data value for each display unit in the target region that is not already associated with a known data value;
selectively assigning each display unit in the target region to one of the plurality of classes based on the known or interpolated data value associated therewith; and
assigning a visual indicator to each display unit in the target region based on the class to which the display unit was assigned.

12. The method of claim 10, wherein the step of further determining whether all of the display units within the target region can be assigned to the same one of the plurality of classes based on the interpolated data values obtained for only the subset of the display units within the target region comprises:
determining whether any display unit within the target region has a known data value associated therewith; and
in response to determining that no display unit within the target region has a known data value associated therewith, further determining whether all of the display units within the target region can be assigned to the same one of the plurality of classes based on the interpolated data values obtained for only the subset of the display units within the target region; and
in response to determining that at least one display unit within the target region has a known data value associated therewith, determining that all of the display units within the target region cannot be assigned to the same one of the plurality of classes based on the interpolated data values obtained for only the subset of the display units within the target region.

13. The method of claim 12, wherein the step of further determining whether all of the display units within the target region can be assigned to the same one of the plurality of classes based on the interpolated data values obtained for only the subset of the display units within the target region comprises:
applying interpolation to obtain the interpolated data values for the subset of the display units within the target region, the subset of the display units within the target region comprising boundary display units and next-to-boundary display units;
selectively assigning each display unit in the subset of the display units within the target region to one of the plurality of classes based on the interpolated data value associated therewith;
determining whether all of the display units in the subset of the display units within the target region have been assigned to the same class;
in response to determining that all of the interpolated data values obtained for the subset of the display units within the target region have been assigned to the same class, further determining whether all of the display units within the target region can be assigned to the same one of the plurality of classes based on the interpolated data values obtained for only the subset of the display units within the target region; and
in response to determining that all of the interpolated data values obtained for the subset of the display units within the target region have not been assigned to the same class, determining that not all of the display units within the target region can be assigned to the same one of the plurality of classes based on the interpolated data values obtained for only the subset of the display units within the target region.

14. The method of claim 13, wherein the step of further determining whether all of the display units within the target region can be assigned to the same one of the plurality of classes based on the interpolated data values obtained for only the subset of the display units within the target region comprises:
calculating a difference for each boundary display unit on a first side of the target region and for each boundary display unit on a second side of the target region, wherein the first side is opposite to the second side and wherein calculating the difference for each boundary display unit comprises subtracting the interpolated data value associated with an adjacent next-to-boundary display unit from the interpolated data value associated with the boundary display unit;
calculating a product by multiplying the difference calculated for each boundary display unit on the first side of the target region by the difference calculated for a corresponding one of the boundary display units on the second side of the target region;
determining whether all the products are negative;

in response to determining that all the products are negative, determining that all of the display units within the target region can be assigned to the same one of the plurality of classes based on the interpolated data values obtained for only the subset of the display units within the target region; and in response to determining that not all the products are negative, determining that not all of the display units within the target region can be assigned to the same one of the plurality of classes based on the interpolated data values obtained for only the subset of the display units within the target region.

15. A system, comprising:
one or more processors; and
a storage medium that stores computer program logic that is executable by the one or more processors to cause the one or more processors to apply a visual classification scheme to display units of a map based on one or more known data values associated with a subset of the display units, the computer program logic comprising:
   a first program module configured to identify a target region of the map, the target region comprising a plurality of display units;
   a second program module configured to obtain interpolated data values for only a subset of the display units within the target region, the number of the display units in the subset being less than the total number of the display units in the target region, the remainder of the display units within the target region not having known data values and interpolated data values therefor;
   a third program module configured to determine whether all of the display units within the target region can be assigned to a same one of a plurality of classes based on the interpolated data values obtained for only the subset of the display units within the target region; and
   a fourth program module configured to assign all of the display units within the target region to the same one of the plurality of classes and assign a visual indicator to each display unit in the target region based on the class to which the display unit was assigned in response to a determination by the third program module that all of the display units within the target region can be assigned to the same one of the plurality of classes based on the interpolated data values obtained for only the subset of the display units within the target region; and
   a fifth program module configured to divide the target region into a plurality of subdivided target regions, each of the plurality of subdivided target regions comprising a new target region for processing by the computer program logic, in response to a determination by the third program module that all of the display units within the target region cannot be assigned to the same one of the plurality of classes based on the interpolated data values obtained for only the subset of the display units within the target region.

16. The system of claim 15, further comprising:
a display;
wherein the fourth program module is further configured to render each of the display units of the target region to the display, wherein rendering each of the display units of the target region to the display comprises rendering the visual indicator assigned to each of the display units to an area of the display associated therewith.

17. The system of claim 15, wherein each display unit comprises one or more pixels.

18. The system of claim 15, wherein each of the plurality of classes represents a different numeric range.

19. The system of claim 15, wherein the visual indicator assigned to each display unit comprises a color.

20. A computer program product comprising a computer-readable storage medium having computer program logic recorded thereon for enabling a processing unit to apply a visual classification scheme to display units of a map based on one or more known data values associated with a subset of the display units, the computer program logic comprising:
   first computer program logic that, when executed by the processing unit, identifies a target region within the map, the target region comprising a plurality of display units;
   second computer program logic that, when executed by the processing unit, obtains interpolated data values for only a subset of the display units within the target region, the number of the display units in the subset being less than the total number of the display units in the target region, the remainder of the display units within the target region not having known data values and interpolated data values therefor;
   third computer program logic that, when executed by the processing unit, determines whether all of the display units within the target region can be assigned to a same one of a plurality of classes based on the interpolated data values obtained for only the subset of the display units within the target region; and
   fourth computer program logic that, when executed by the processing unit, assigns all of the display units within the target region to the same one of the plurality of classes and assigns a visual indicator to each display unit in the target region based on the class to which the display unit was assigned in response to a determination that all of the display units within the target region can be assigned to the same one of the plurality of classes based on the interpolated data values obtained for only the subset of the display units within the target region.

* * * * *